Patented July 27, 1943

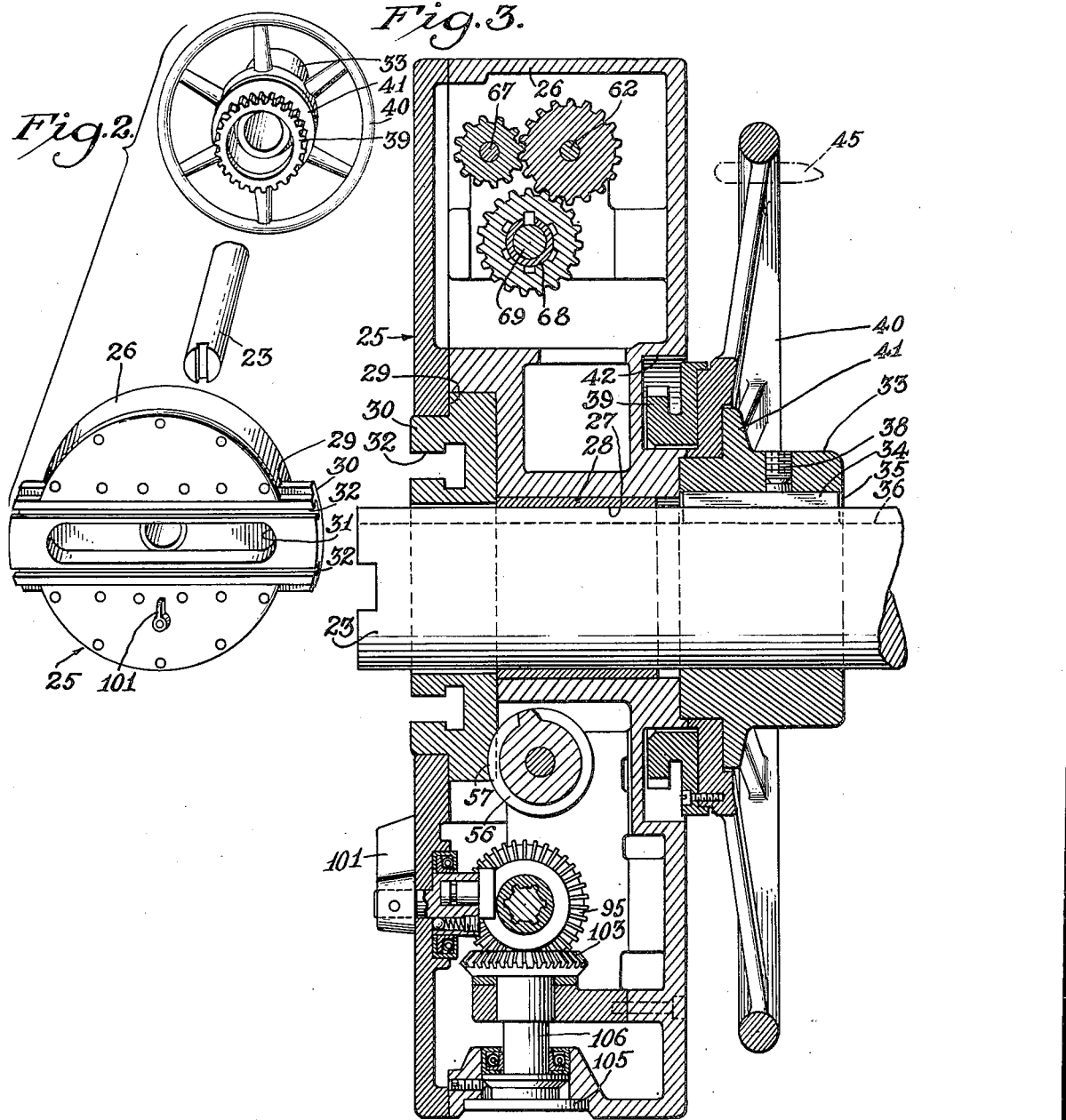

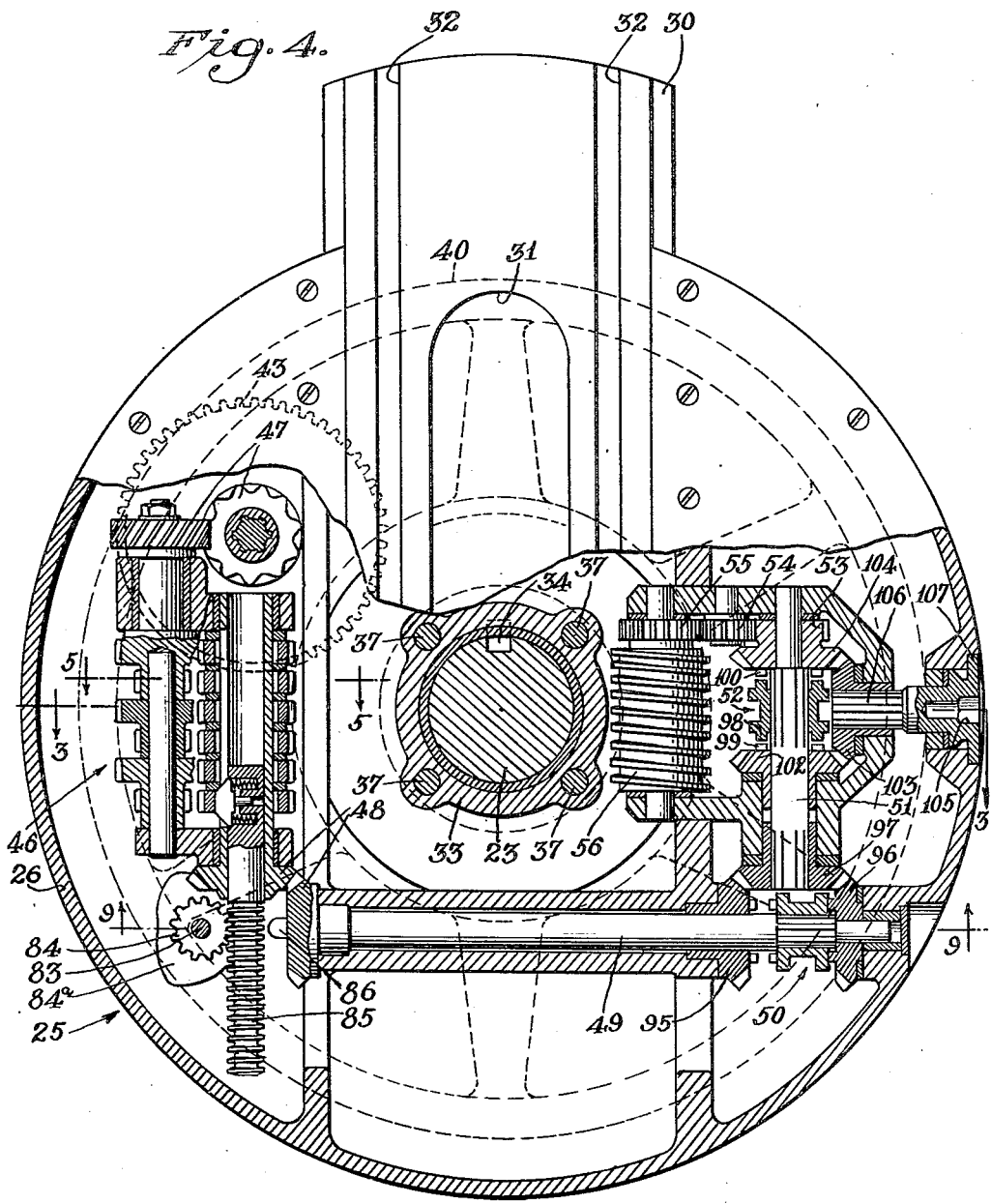

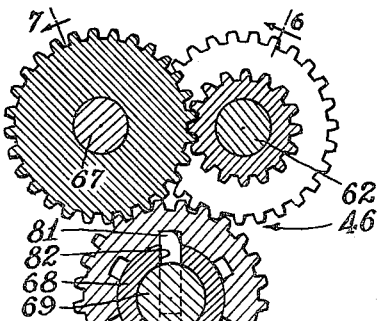
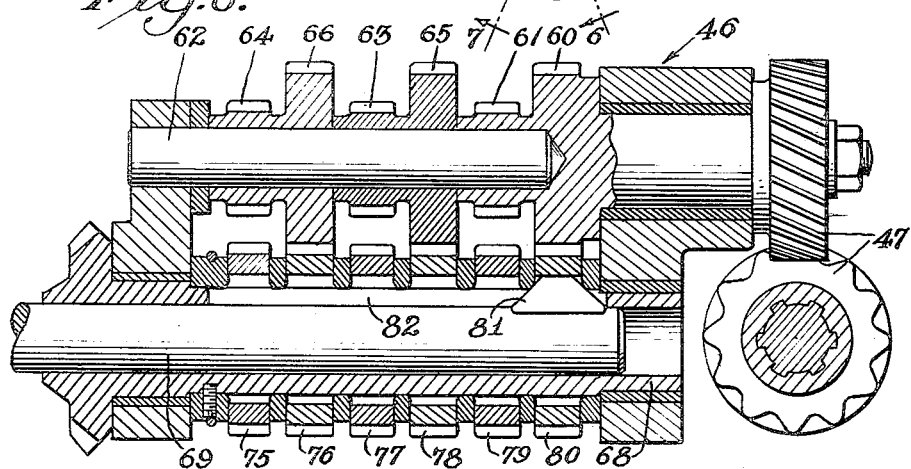
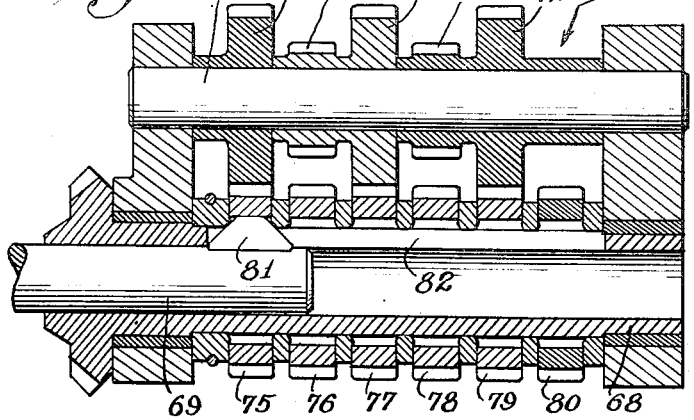

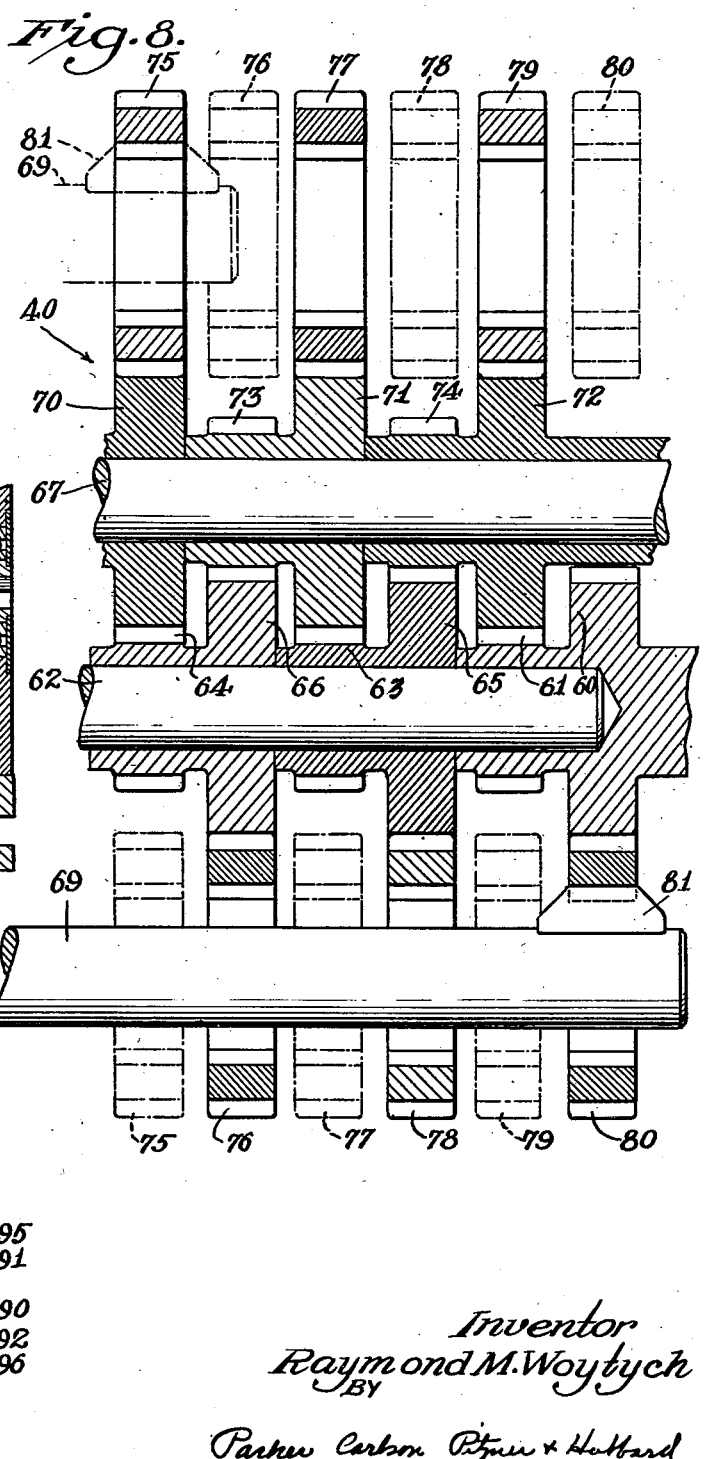

2,325,294

UNITED STATES PATENT OFFICE 2,325,294

MACHINE TOOL

Raymond M. Woytych, Fond du Lac, Wis., assignor to Giddings & Lewis Machine Tool Co., Fond du Lac, Wis., a corporation of Wisconsin Application April 24, 1941, Serial No. 390,099

4 Claims. (Cl. 82—1)

The invention relates to improvements to machine tools and has particular reference to a novel attachment which is especially adapted for use in so-called "floor type" horizontal boring, drilling and milling machines, in other words, such machines in which the work is fixed to a stationary bed plate on the floor and the boring bar itself fed horizontally to traverse a tool relative to the work.

The general aim of the present invention is to provide a self-contained attachment for continuous feed facing, boring, drilling or tapping which is adapted for application to, and actuation from, a projectable spindle or boring bar or the like, as for example, in a machine of the type indicated above.

A more specific object of the invention is to provide an attachment of the character indicated, together with means for mounting it on a spindle or boring bar, in which the arrangement is such that a tool slide on the attachment is fed in timed relation with the spindle rotation irrespective of the position of axial projection of the spindle relative to the machine structure in which the spindle is journaled.

Another object is to provide an attachment of the general character indicated embodying a novel manual feed arrangement for a tool slide on the attachment, available alternatively to the power feed.

Still another object is to provide an improved attachment of the general character indicated which is especially compact and low in weight as well as rugged in construction.

Further objects and advantages of the invention will become apparent as the description proceeds, taken in connection with the accompanying drawings in which:

Fig. 2 is an exploded perspective view of the attachment, its adaptor, and an end of the spindle to which it is secured.

Fig. 3 is an enlarged traverse sectional view taken substantially along the line 3—3 in Fig. 4 of the attachment and associated parts.

Fig. 4 is an enlarged front elevational view of the attachment, with a portion of the cover broken away to show the arrangement of the interiorly located parts.

Fig. 5 is a transverse sectional view, taken substantially along the line 5—5 in Fig. 4, of the speed change gearing included in the attachment.

Figure 1:
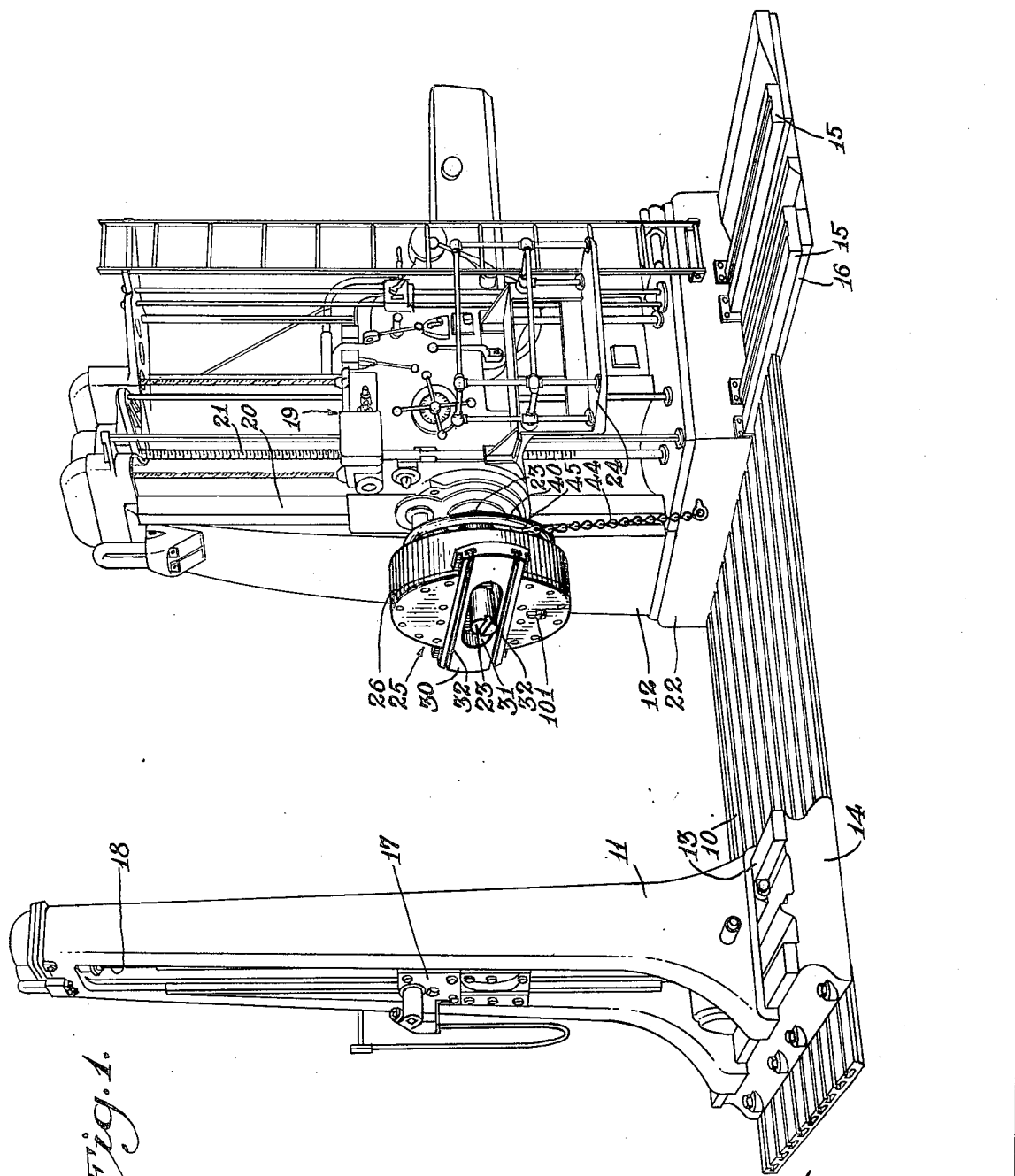
Figure 1 is a general perspective view of a floor type horizontal boring, drilling and milling machine with an attachment applied thereto embodying the present invention.

Figs. 6 and 7 are longitudinal sectional views taken respectively, substantially along the lines 6—6 and 7—7 in Fig. 5.

Fig. 8 is a diagrammatical layout of the speed change gearing.

Fig. 9 is a sectional view along the line 9—9 in Fig. 4.

While the invention is susceptible of various modifications and alternative constructions, I have shown in the drawings and will herein describe in detail the preferred embodiment and utilization thereof, but it is to be understood that I do not thereby intend to limit the invention to the specific form disclosed or use, but intend to cover all modifications and alternative constructions and applications falling within the spirit and scope of the invention as expressed in the appended claims.

For purpose of exemplification the invention has been shown herein (Fig. 1) as embodied in an attachment applied to a floor type horizontal boring, drilling and milling machine. This particular application of the invention has been chosen for purposes of illustration because in such a machine the problems which the present invention solves are particularly acute. In such a floor type machine the work is fixed to a stationary bed rather than to a traversable table. The boring bar or tool spindle is in such a floor type machine as that shown, projected axially toward and away from the stationarily mounted work. Accordingly, a facing attachment carried on the spindle must be capable of full operation, even though moved bodily back and forth with the spindle and, hence, displaced at various distances from the head stock which carries the spindle and from which the attachment might otherwise be driven. Further particulars as to this difficulty and the manner in which it is overcome in accordance with the present invention will become apparent as the following description of the exemplary machine proceeds.

In the illustrated machine (see Fig. 1) the work (not shown) is mounted on a stationary bed 10 anchored in the floor so that extremely heavy, large work pieces can be accommodated, due to the fact that they need not be moved in the course of the machine's operation. On opposite sides of the bed are a tailstock column 11 and a headstock column 12. Each of the columns 11 and 12 is traversable in a direction transverse to the bed 10. Thus, the tailstock column 11 is mounted on horizontal guides 13 fixed to a base 14 that is in turn bolted to the bed 10. On the other hand, the headstock column 12 is traversable along horizontal ways 15 parallel to the first mentioned ways 13 and fixed to a base 16 anchored in the floor. Suitable power actuated means (not shown) may be provided for traversing the columns 11 and 12 along their respective guideways.

On the tailstock column 11 is a vertically slidable tailstock 17. This tailstock is adapted to be traversed vertically along the column by means of a vertical feed screw 18 driven from any suitable power means (not shown).

At the opposite side of the bed, a headstock 19 is slidably mounted on vertical ways 20 fixed on the front face of the headstock column 12. The headstock 19 is supported and adapted to be traversed by means of a vertical feed screw 21 connected at its lower end to a suitable power actuating mechanism (not shown) housed in the base 22 of the column. The details of the connections drive mechanism for vertically traversing the headstock and tailstock form no part of the present invention and consequently have not been detailed here since a number of suitable forms are well known in the art.

Projecting from the left hand end of the headstock (as viewed in Fig. 1) is a rotatably journaled spindle or boring bar 23. Suitable power actuated means is provided in the headstock for rotating the spindle 23 as well as for feeding the same axially under the control of an operator who may ride on the platform 24 attached to the headstock 19. Again various forms of power actuating means suitable for the purpose of rotating and feeding the spindle 23 axially are well known in the art and consequently have not been illustrated here. By way of example, reference may be made to Patent No. 1,858,491 issued May 17, 1932, to Keith F. Gallimore.

Carried by the spindle 23 and movable bodily with it in the course of the movement of the spindle is an attachment, designated generally as 25. This attachment 25 may be utilized in the course of various machining operations such as facing, boring, drilling or tapping, and for the sake of brevity is usually hereinafter referred to as the "facing attachment."

In its illustrative form (see Figs. 1 to 5) the facing attachment 25 comprises a generally cylindrical or drum shaped housing 26 arranged coaxially with the spindle 23 and having a central opening 27 in it through which the latter projects, the casing being slidably supported on the boring bar by a sleeve bearing 28 (Fig. 3).

Extending diametrically across the front face of the housing 26, in a vertical plane, are ways 29 on which a tool slide 30 is slidably mounted for endwise movement in a path transverse to and intersecting the axis of rotation of the housing. An elongated central slot 31 is fashioned in the slide 30 to receive the projecting end of the spindle 23 so that the slide may be moved freely along the ways 29 without interfering with the spindle. T-slots 32 extending along the face of the slide 30 accommodate the mounting of various boring or facing tools on the slide.

Briefly stated, facing is, in the present machine accomplished by moving a facing or scalping tool, fixed to slide 30 across a work piece surface in a spiral path so as to cover progressively the area to be faced. For this purpose a tool is fixed to the slide 30 and the latter is fed along the ways 29 in exact timed relation with the rotation of the housing 26. In the present instance provision is made for selectively varying the rate of slide feed with respect to the angular speed of rotation of the housing so as to vary the spacing between adjacent convolutions of the spiral cut by the tool.

To fix the attachment to the spindle 23 at any desired point along the latter, an adaptor 33 is provided (Figs. 2 and 3). This adaptor 33 is of sleeve form and is fixed against rotation relative to the spindle by a drive key 34 received in complemental slots 35 and 36 in the sleeve and spindle respectively. The attachment housing 26 is bolted to this adaptor 33, the bolts being shown as parts 37 in Fig. 4. As so far described, the adaptor 33 and attachment 25 are freely slidable endwise of the spindle 23 and such sliding movement is utilized to effect a desired initial positioning of the attachment. To hold the attachment 25 in place on the spindle a set screw 38 (Fig. 3) is threaded in the adaptor and arranged to press the drive key 34 into frictional engagement with the root of the keyway 36 in the spindle.

With the attachment thus adjustably mounted on the spindle 23, which is itself projectable away from the headstock 19 in which it is journaled, the problem is presented of supplying to the attachment 25, i. e. power for feeding the tool slide 30 on it. Desirably the drive mechanism should be a rugged and generally self-contained arrangement though the necessity for minimizing the overhanging weight imposed on the spindle by the attachment 25 makes it undesirable to incorporate a separate prime movement in the latter. On the other hand, it is also desirable that a wide variety of feed speeds for the slide 30 be afforded and that the direction of feed be determinable at will, irrespective of the direction of spindle rotation, though the various feed speeds should bear a predetermined ratio to the spindle's angular speed.

To meet the varied requirements noted above I have devised a driving arrangement, which in the form illustrated (Figs. 2 and 3), comprises an annular or ring gear 39 fixed to the hub of a hand wheel 40 that is in turn freely journaled on the adaptor 33. The hub of the hand wheel 40 is received between a flange 41 on the adaptor 33 and the rear face of the attachment housing 26. An annular recess 42 in the rear face of the housing 26 affords clearance space for the ring gear 39.

By holding the hand wheel 40, and hence the attached ring gear 39 against rotation, a pinion or gear 43 in the attachment (Fig. 4) meshing with the ring gear 39 is caused to roll around the ring gear as the attachment 25 revolves. Such rotation of the pinion 43 is, of course, in timed relation with the rotation of the attachment 25 and is utilized to actuate a drive mechanism connected to the tool slide 30 for traversing the same.

The hand wheel 40 can be easily held by the operator for the purpose indicated since the reaction torque on it, in feeding the slide, is quite small. In order to relieve the operator of the tedium of standing and holding the hand wheel throughout a long feed operation, a releasable anchorage arrangement is provided for the hand wheel. This arrangement comprises a flexible line or chain 44 (see Fig. 1) anchored to the headstock column 12 and having a hook 45 on its free end to engage the hand wheel.

The layout of the drive connection, in the attachment, from the driving pinion 43 to the tool slide 30, may best be seen in Fig. 4. In brief, it includes a speed-change gearing, designated generally as 46, to which the pinion 43 is drivingly connected through a pair of spiral gears 47. At the driven or outlet end of the speed-change gearing 46 a pair of bevel gears 48 connect it to a transverse shaft 49, the other end of this latter shaft 49 being connected through a reversing clutch mechanism 50 with a stub shaft 51. The reversing clutch 50 is automatically controlled, in a manner which will hereinafter appear, coincidentally with changes in the setting of the speed-change gearing 46, so that rotation of the stub shaft 51 will be unidirectional, irrespective of the setting of the speed-change gearing. The stub shaft 51 is in turn connected through a manually controlled reversing mechanism 52 to a pinion 53. This pinion 53 meshes with an idler pinion 54 which in turn meshes with a pinion 55 on the end of a screw 56, which meshes with an elongated segmental nut 57 rigid with the edge of the slide 30 (see Fig. 3) so that the slide is driven endwise along the ways 29 by rotation of the screw 56. The direction of slide feed is of course controlled by the reversing mechanism 52 while the rate of slide feed (with relation to the angular speed of rotation of the attachment) is controlled by the setting of the speed-change gearing 46.

It should be understood that the particular form of speed-change gearing herein utilized is described and claimed in my copending application Serial No. 329,699 filed April 15, 1940, now Patent No. 2,273,807, dated February 17, 1942.

Turning now to the details of the various elements included in the drive connection in the attachment outlined above, the first element, namely, the speed-change gearing 46 is of the drive-key type and the various gear elements in it are so chosen and related that each speed setting bears a true geometric-progression relation to the other settings. At the inlet end of the speed-change gearing (see Figs. 4 and 6) the spiral gear 47 is fast on a first driving gear cluster including a gear 60 and a pinion 61. Coaxial with this gear cluster is a stationary shaft 62 also having loosely journaled thereon two further gear clusters each made up of one of the pinions 63 and 64, and a corresponding one of the gears 65 and 66 (see also Fig. 8). Further, the speed-change gearing 46 includes a stationary intermediate shaft 67 and a hollow tubular driven shaft 68 within which is telescoped a shaft 69. On the intermediate shaft 67 are loosely journaled a gear 70 and two gear clusters made up respectively of gears 71 and 72, as well as pinions 73 and 74 (see particularly Fig. 7). On the tubular shaft 68 six driven gears 75-80 are loosely journaled, which correspond to the six different speed settings of the speed-change gearing.

To condition the gearing for a selected speed setting, the corresponding one of the driven gears 75-80 is connected to the driven shaft 68 by a drive-key 81 (Figs. 4, 6, 7 and 8). This drive-key is of conventional form being carried on the shaft 69 and yieldably urged into engagement with a registering one of the driven gears by suitable springs (shown in Fig. 4). The nose of the drive-key projects through a longitudinal slot 82 in the tubular driven shaft 68 (see Figs. 5 to 7) and into complemental grooves in the hubs of the driven gears 75-80.

To shift the drive-key 81 axially of the tubular driven shaft 68 into engagement with a selected one of the driven gears 75-80, a manually operable speed-selection mechanism is provided. This mechanism includes a stub shaft 83 (see Figs. 4 and 9) projecting through the wall of the attachment housing 26 and having its outer end socketed to receive a hand crank (not shown). Fast on the stub shaft 83 is a pinion 84 meshing with a circular toothed rack 85 on the free end of the shaft 69 so that rotation of the pinion 84 serves to shift the shaft 69 axially and to bring the drive-key 81 into engagement with the desired one of the driven gears.

The various trains of gears which are active for the different speed settings can best be seen by reference to the diagrammatic layout in Fig. 8. In this layout or development of the gearing, the series of driven gears have been reproduced at both the top and bottom of the figure. In the event that the drive-key 81 engages, for example, the driven gear 80 (as shown in full lines in Fig. 8) the drive is directly from the driving gear 60 to the meshing driven gear 80. Similarly, when the drive-key 81 is shifted into engagement with the next driven gear 79, the drive is from the drive pinion 61 to the meshing intermediate gears 72 and thence to the driven gear 79. The table below sets out the gear connections for the six different settings of the speed-change gearing.

| Speed setting | Driven gear keyed to driven shaft | Gear train to selected driven gear |
|---|---|---|
| 1 | 80 | 60—80 |
| 2 | 79 | 61—72—79 |
| 3 | 78 | 61—72—74—65—78 |
| 4 | 77 | 61—72—74—65—63—71—77 |
| 5 | 76 | 61—72—74—65—63—71—73—66—76 |
| 6 | 75 | 61—72—74—65—63—71—73—66—64—70—75 |

From an inspection of the foregoing tabulation it will be seen that the various driven gears are meshed into the series train of cluster gears at successive points. In this way all of the gears used in the second setting are used in the third, all of those used in the third are used in the fourth, etc. so that a minimum number of gears are required for maximum variations in speed.

The speed-change gearing 46 described above is such that the direction of rotation of the driven shaft 68 is reversed for alternate settings of the speed-change gearing. It is desirable, however, that the shaft 51 (see Fig. 4) be driven unidirectionally despite changes in speed as previously noted and, accordingly, the reversing clutch 50 is arranged to be automatically actuated in accordance with the setting of the speed-change gearing so as to compensate for the reversals in the speed-change gearing incident to changes in the latter's setting. For this purpose a three-lobe peripheral cam 84ᵃ (Fig. 4) is fixed on the setting-control shaft 83 of the speed-change gearing. An axially slidable cam follower rod 86 is urged against the cam 84ᵃ by a compression spring 87 (Fig. 9) bearing against a collar 88 pressed against a shoulder on the rod. A clutch shifter shoe 89 slidably carried on the rod 86 serves to shift a toothed clutch driver 90, which is splined on the shaft 49, into engagement with one or the other of the toothed driven clutch members 91—92. The cam 84ᵃ is indexed a sixth of a revolution of each step in the gear setting so it alternately brings a lobe and a depression into engagement with the cam follower rod 86 with the result that the upper and lower clutch members 91—92 are alternately engaged. To avoid jamming and breakage of the clutch by positive actuation of it by the cam 84ᵃ when the clutch teeth are not in registry, a yieldable connection is used between the cam follower rod 86 and the shifter shoe 89. For this purpose a second compression spring 93 is interposed between the shifter shoe 89 and a collar 94 pinned on the rod.

Bevel gears 95—96 on the clutch driven members 91—92 respectively mesh with a bevel gear 97 (Fig. 4) on the shaft 51, so that this shaft is driven through one or the other of the clutch gears 95—96 depending upon the setting of the reversing clutch 50. Since the cam 84ᵃ is shifted coincidentally with changes in the speed-change gear setting, the reversing clutch 50 automatically retains the rotation of the shaft 51 unidirectional.

In order to control the direction of feed of the tool slide 30, the manually operable reversing clutch 52 is interposed between the unidirectional shaft 51 and the screw 56 which meshes with the segmental nut on the slide 30 as heretofore noted (Fig. 4). This reversing clutch 52 is of conventional form and embodies a shiftable clutch driver 98 splined on the shaft 51. This driver is shiftable from its neutral position illustrated alternatively into engagement with one or the other of clutch driven members 99 and 100. A hand lever 101 (see Figs. 2, 3 and 4) on the front face of the attachment casing 26 serves, upon oscillation, to shift the clutch driver 98 into either neutral, forward or reverse position. When the clutch driver 98 is engaged with the driven member 100 the drive is completed directly from the shaft 51 through the pinions 53, 54, 55 to the screw 56. On the other hand when the clutch driver 98 is engaged with the other clutch driven member 99 a drive in the opposite direction is completed from the shaft 51 through a bevel gear 102 fast on the driven member 99, and thence through an idler bevel gear 103 to a third bevel gear 104 fast on the pinion 53.

In addition to the power feed connection described above the tool slide 30 may be traversed by hand through the medium of either of two alternatively available manual feed arrangements. Such manual feed is, of course, desirable in effecting a precise initial positioning of the tool slide when commencing a machining operation and also at various other times. One of the two available manual feed arrangements includes the provision of a socket 105 (Fig. 4) at the outer end of a shaft 106 carrying the bevel gear 103. A suitable hand crank (not shown) can be connected to this socket so that the shaft 106 can be turned by hand and the screw 56 thus revolved to feed the slide in a desired direction. For the alternatively available manual feed the hand wheel 40 may be utilized. As to this it will be observed that when the spindle 23 and attachment 25 are at rest, turning of the hand wheel 40 serves to revolve the drive pinion 43 so that the slide is driven through the same gearing connections utilized in the attachment during power feed.

A micrometer dial 107 (Fig. 4) is mounted on the outer end of the shaft 106 so as to afford a continuous indication of the position of the tool slide. In view of the fact that this shaft 106 is connected (through bevel gears 103, 104) with the pinion 53 and thence to the screw 56, the shaft 106 always turns whenever the screw 56 turns. Accordingly, the micrometer dial 107 affords an accurate indication of the location of the tool slide irrespective of whether the slide is being fed by power or by either of the two alternatively available manual feed arrangements.

*Brief résumé of operation*

The general mode of operation of the attachment will be clear from the foregoing. By way of synopsis it may be noted that to condition the machine for use the attachment 25, with the adaptor 33 bolted to it, is slipped onto the projecting end of the spindle 23. The attachment and adaptor are slid along the spindle until located at substantially the desired point. Thereupon the set screw 38 (see Fig. 3) is tightened so as to fix the attachment and adaptor rigidly to the spindle. More precise location of the attachment in a horizontal direction, or readjustment of its location in such direction, is accomplished by projecting or retracting the spindle through the usual mechanism provided for such spindle movement in the headstock 19.

Initial location of a surfacing or boring tool (not shown) fixed to the slide 30 on the attachment to start a cut is accomplished by manually feeding the slide to a desired point in its path of movement along the guideway 29. For this purpose the operator can either revolve the hand wheel 40 to feed the slide manually or alternatively can engage the socket 105 of the stub shaft 106 (see Fig. 4) with a hand crank and revolve the latter stub shaft so as to feed the slide. In either case the displacement of the slide is indicated by the micrometer dial 107.

Also as a further preliminary to operation of the machine, the speed-change gearing 46 is set for a desired feed speed for the attachment slide 30 and the reversing mechanism 52 set for a desired direction of slide feed.

Having preliminarily conditioned the machine for operation as described above, power rotation of the spindle 23 is initiated and the operator grasps the hand wheel 40 to hold it against turning. With the hand wheel 40 thus held against rotation the pinion 43 rolls around it and is thus revolved. This drive pinion 43 in turn feeds the slide 30 through the drive connection comprising the speed-change gearing 46 and reversing mechanism 52 as heretofore described. Accordingly, the feed speed and direction of feed are determined by the preliminary setting of the elements 46 and 52 noted above. If the feeding operation is to be continued for a substantial period of time the operator may conveniently anchor the hand wheel 40 against rotation by means of the anchorage chain 44. Further power feeding of the slide 30 may be interrupted at any time either by stopping the spindle 23 or freeing the hand wheel 40 to turn with the spindle.

It will be observed that with the arrangement described the spindle 23 can be freely projected or retracted to accommodate different locations of workpieces on the bed 10 without in any way interrupting or interfering with the power feed drive for the tool holder slide 30 on the attachment. On the other hand the attachment, and the adaptor connected thereto, comprise an entirely self-contained unit which can be easily applied to or removed from the machine and readily manipulated as a unit. In view of the speed-change and reversing mechanisms embodied in the attachment 25 it is possible to control the rate or direction of slide feed for the attachment quite independently of the speed or direction of spindle rotation.

I claim as my invention:

1. For use in a machine tool having a revoluble power driven spindle, the combination of an attachment comprising a casing having a central aperture therein to receive the spindle, an adaptor sleeve fixed to said casing coaxially therewith and dimensioned to be telescoped over the spindle, means for releasably fixing said adaptor sleeve and casing to the spindle, said attachment also including a guideway and a tool slide traversable along the guideway, an annular gear freely journaled on said adaptor sleeve, a hand wheel rigid with said annular gear, a flexible line releasably connected to said hand wheel for anchoring the same aganist rotation to hold said gear stationary, and means including a second gear in said attachment and meshing with said annular gear for feeding said slide in timed relation with the rotation of said attachment as the latter revolves and said second gear rolls around the stationary annular gear.

2. For use in a machine tool having a revoluble power driven spindle, the combination of an attachment adapted to be removably fixed on the spindle and including a guideway extending generally transverse to the axis of rotation of such attachment and a slide traversable along the guideway, said attachment also including power actuated means for traversing said slide in timed relation with the attachment rotation, said last mentioned means including a reversing mechanism comprising a pair of bevel gears each meshing with a third bevel gear, a drive member and a clutch shiftable from a central position alternately to connect one or the other of said bevel gears to said driven member, driving means operatively connecting said slide in driven relation at all times to one of said pair of bevel gears so that said slide is driven from said driving member through said one bevel gear alone, or through all three of said bevel gears in series, in corresponding alternative engaged positions of the clutch and is disconnected from the driving member when the clutch is in neutral, manually operable means for rotating the third bevel gear to traverse said slide by hand, an annular gear coaxial with the axis of rotation of said attachment and freely revoluble with respect thereto, means including a second gear meshing with said annular gear and included in said attachment for revolving said driving member, and a hand grip member rigid with said annular gear for not only holding the same against rotation when the attachment is revolving, but also for turning said annular gear by hand when the attachment is stationary to effect a manual feed of the slide.

3. For use in a machine tool having a revoluble power driven spindle, the combination of an attachment adapted to be removably fixed on the spindle and including a guideway extending generally transverse to the axis of rotation of such attachment and a slide traversable along the guideway, said attachment also including power actuated means for traversing said slide in timed relation with the attachment rotation, said last mentioned means including a reversing mechanism comprising a pair of bevel gears each meshing with a third bevel gear, a drive member and a clutch shiftable from a central position alternately to connect one or the other of said bevel gears to said driven member, driving means operatively connecting said slide in driven relation at all times to one of said pair of bevel gears so that said slide is driven from said driving member through said one bevel gear alone, or through all three of said bevel gears in series, in corresponding alternative engaged positions of the clutch and is disconnected from the driving member when the clutch is in neutral, manually operable means for rotating the third bevel gear to traverse said slide by hand, an annular gear coaxial with the axis of rotation of said attachment and freely revoluble with respect thereto, means including a second gear meshing with said annular gear and included in said attachment for revolving said driving member, a hand grip member rigid with said annular gear for not only holding the same against rotation when the attachment is revolving, but also for turning said annular gear by hand when the attachment is stationary to effect a manual feed of the slide, and a micrometer dial mechanism operatively connected to said third bevel gear for indicating the tool slide position continuously and irrespective of whether the slide be fed by the power actuating system or by either of the alternatively available manual feeds.

4. For use in a machine tool having a revoluble power driven spindle, the combination of a cylindrical hollow casing having a guideway extending generally diametrically across one end of the casing, said casing being centrally apertured so as to be telescoped on the spindle, a tool supporting slide traversable along the guideway, power actuated means within the casing for traversing said slide including a speed change gearing and a first rotatable toothed member meshing with a second complemental toothed member fixed to the slide, said speed change gearing and said pair of toothed members being disposed within said casing on diametrically opposite sides of the axis of rotation thereof to minimize the overall diameter of the casing, an annular gear, means supporting said annular gear coaxially with the casing and for free rotation relative thereto, a second gear journaled on the casing and meshing with said annular gear for driving said power actuated means as the casing revolves with respect to the annular gear, and manually operable means for releasably restraining said annular gear against rotation.

RAYMOND M. WOYTYCH.